United States Patent
Koo

(10) Patent No.: US 10,411,900 B2
(45) Date of Patent: Sep. 10, 2019

(54) CONTROL WORD PROTECTION METHOD FOR CONDITIONAL ACCESS SYSTEM

(71) Applicant: ELECTRONICS AND TELECOMMUNICATIONS RESEARCH INSTITUTE, Daejeon (KR)

(72) Inventor: Han-Seung Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 3 days.

(21) Appl. No.: 15/629,956

(22) Filed: Jun. 22, 2017

(65) Prior Publication Data

US 2018/0019877 A1    Jan. 18, 2018

(30) Foreign Application Priority Data

Jul. 12, 2016   (KR) ........................ 10-2016-0088202
Jul. 18, 2016   (KR) ........................ 10-2016-0090722

(51) Int. Cl.
*H04L 9/32* (2006.01)
*G06F 21/72* (2013.01)
*H04L 29/06* (2006.01)

(52) U.S. Cl.
CPC ............ *H04L 9/3247* (2013.01); *G06F 21/72* (2013.01); *H04L 63/0442* (2013.01); *H04L 63/06* (2013.01); *H04L 63/061* (2013.01); *H04L 63/0876* (2013.01); *H04L 63/10* (2013.01); *H04L 63/126* (2013.01); *H04L 2463/062* (2013.01); *H04L 2463/101* (2013.01)

(58) Field of Classification Search
None
See application file for complete search history.

(56) References Cited

U.S. PATENT DOCUMENTS

| | | | |
|---|---|---|---|
| 6,252,964 B1 * | 6/2001 | Wasilewski | H04L 63/04 |
| | | | 348/E5.004 |
| 6,292,568 B1 * | 9/2001 | Akins, III | H04L 63/0428 |
| | | | 348/E5.004 |
| 9,270,465 B2 * | 2/2016 | Roelse | H04L 9/0825 |
| 9,402,108 B2 * | 7/2016 | Roelse | H04N 21/26613 |

(Continued)

FOREIGN PATENT DOCUMENTS

| | | |
|---|---|---|
| KR | 10-2014-0034725 | 3/2014 |
| WO | 2012/072703 | 6/2012 |
| WO | 2012/072707 | 6/2012 |

OTHER PUBLICATIONS

"Digital Video Broadcasting (DVB); Support for use of the DVB Scrambling Algorithm version 3 with digital broadcasting systems", Nov. 2013, DVB Document A125, p. 1-13.*

(Continued)

*Primary Examiner* — Christopher A Revak
(74) *Attorney, Agent, or Firm* — Kile Park Reed & Houtteman PLLC

(57) ABSTRACT

Disclosed herein is a control word protection method for a conditional access system. There is provided a method for allowing a chipset of a receiver to securely obtain control words for descrambling scrambled content transmitted from a content delivery network.

10 Claims, 8 Drawing Sheets

(56) References Cited

U.S. PATENT DOCUMENTS

| | | | |
|---|---|---|---|
| 2005/0135617 A1* | 6/2005 | Cho | H04N 7/1675 380/210 |
| 2007/0177733 A1* | 8/2007 | Wajs | H04L 9/0822 380/228 |
| 2009/0210706 A1* | 8/2009 | Kannan | H04L 63/062 713/168 |
| 2010/0182858 A1* | 7/2010 | Kaku | G11C 8/08 365/194 |
| 2012/0148042 A1 | 6/2012 | Koo | |
| 2014/0281537 A1* | 9/2014 | Okimoto | H04N 21/835 713/168 |
| 2014/0310527 A1* | 10/2014 | Veugen | H04L 9/3013 713/171 |
| 2016/0165279 A1 | 6/2016 | Koo | |

OTHER PUBLICATIONS

Gemplus, Oberthur, "PayTV model", May 2003, 3GPP TSB SA WG3 Security—S3#28, p. 1-5.*

* cited by examiner

CONTROL WORD PROTECTION METHOD FOR CONDITIONAL ACCESS SYSTEM

CROSS REFERENCE TO RELATED APPLICATIONS

This application claims the benefit of Korean Patent Application Nos. 10-2016-0088202, filed Jul. 12, 2016 and 10-2016-0090722, filed Jul. 18, 2016, which are hereby incorporated by reference in their entirety into this application.

BACKGROUND OF THE INVENTION

1. Technical Field

The present invention relates to a conditional access system.

2. Description of the Related Art

Descriptions in this field are intended to merely provide background information of the present embodiments and are not intended to describe the configuration of conventional technology.

A conditional access system is widely used in relation to various forms of content delivery service. Such a system provides secure transmission of content streams to, for example, a set-top box, or a digital receiver included in a mobile terminal that supports a content delivery service. In order to protect content from unauthorized viewing, data packets in the streams are scrambled (encrypted) using a randomly generated encryption key that is typically referred to as a "control word". In order to reinforce the security of streams, a control word is periodically changed.

In order to descramble scrambled data packets in transmission streams, a receiver must be notified of the current value of the control word. For the secure transmission of control words, the control words are transmitted to the receiver, with the control words being encrypted using so-called Entitlement Control Messages (ECMs). In order to process the ECMs, Entitlement Management Messages (EMMs) are used to transmit and manage keys required in order to decrypt the ECMs. ECM and EMM information streams are transmitted to the receiver, so that the receiver decrypts the EMMs and the ECMs and descrambles the content for an authorized subscriber.

A content provider uses a content protection system to encrypt digital content thereof and to protect the content from unauthorized access. For this, a content receiver includes a chipset in which one or more content decryption operations are implemented. A cryptographic key establishment protocol is used to securely transmit content decryption keys from the content protection system to the chipset included in the content receiver. Some steps of the cryptographic key establishment protocol implemented in the chipset of the content receiver are typically referred to as a "key ladder". In relation to this key ladder, the European Telecommunications Standards Institute (ETSI) currently discusses standardization for "Embedded Common Interface (ECI) for exchangeable Conditional Access (CA)/Digital Rights Management (DRM) solutions" as a group standard.

SUMMARY OF THE INVENTION

Accordingly, the present invention has been made keeping in mind the above problems occurring in the prior art, and an object of the present invention is to provide a protocol or a method for protecting control words in a conditional access system.

In accordance with an aspect of the present invention, there is provided a method for securely obtaining a control word, the method allowing a chipset of a receiver to securely obtain a control word (CW) for descrambling scrambled content transmitted from a content delivery network.

The method may include receiving a secure version of a link key (LK) from a processor of the receiver communicably connected to the chipset. The secure version of the link key may be encrypted using a public key (CPK) associated with the chipset so that confidentiality of the link key is protected, and is obtained by making a signature using a signature key (SSK) associated with a sender so that authenticity of the link key is protected.

The method may further include using a signature verification key (SPK) corresponding to the signature key (SSK) and a secret key (CSK) associated with the chipset in order to obtain the link key (LK) from the secure version of the link key; and receiving a secure version of provisioning data from the processor. The provisioning data may include a bit string (CW-URI) defining usage rule information for the control word (CW), and the secure version of the provisioning data is obtained by attaching a message authentication code (MAC) using the link key (LK) or a key derived from the link key to the provisioning data, or by making a signature using the signature key (SSK) associated with the sender so that authenticity of the provisioning data is protected.

The method may further include using the link key (LK) or the signature verification key (SPK) corresponding to the signature key (SSK) to verify authenticity of the secure version of the provisioning data, receiving a secure version of a virtual control word (r) from the processor, and using the obtained link key (LK) to obtain the virtual control word (r) from the secure version of the virtual control word (r). The method may further include using a cryptographic function (h) to generate the control word (CW) from inputs. The inputs may include the virtual control word (r), the signature verification key (SPK), and the provisioning data.

The embodiments of the method may further include one or more of the following features.

In some embodiments, the provisioning data may further include a bit string ($\tau_b$) indicating the presence or absence of associated data, and a bit string (AD) indicating application data.

In some embodiments, the provisioning data may be configured to selectively include at least one of i) the bit string (CW-URI) defining the usage rule information for the control word (CW), and ii) the bit string (AD) indicating the application data, and the provisioning data may further include a bit string ($flag_b$) defining whether each of the bit strings is included in the provisioning data.

In some embodiments, the secure version of the link key (LK) may include i) a unique chipset ID (chipset ID) associated with the chipset, ii) a link key (LK) encrypted using the public key (CPK) associated with the chipset, and iii) a signature generated from the chipset ID and the encrypted link key (LK) using the signature key associated with the sender.

In some embodiments, using a signature verification key (SPK) includes i) verifying the signature using the signature verification key (SPK) corresponding to the signature key (SSK), and ii) decrypting the encrypted link key (LK) using the secret key (CSK) associated with the chipset.

In some embodiments, the method may further include receiving multiple signature verification keys from the processor, and verifying the signature included in the secure version of the link key (LK) using one of the received signature verification keys. Here, each of the signature verification keys may be associated with a conditional access/digital rights management system corresponding thereto.

In some embodiments, the method may further include storing, by the chipset, the link key (LK) obtained from the encrypted link key (LK) in order to use the link key (LK) for decrypting the secure version of the virtual control word (r), received by the chipset, and verify authenticity of the secure version of the provisioning data.

In some embodiments, the method may further include determining, using the stored link key (LK), whether the message authentication code is identical to a message authentication code attached to the secure version of the provisioning data, wherein if it is determined using the stored link key (LK) that the message authentication code is not identical to the message authentication code attached to the secure version of the provisioning data, the link key (LK) is not used to obtain the virtual control word (r) from the secure version of the virtual control word (r).

In some embodiments, the provisioning data may include i) the bit string (CW-URI) defining the usage rule information for the control word (CW), and ii) the bit string (AD) indicating the application data. The secure version of the provisioning data may include a first message in which the message authentication code is attached to the bit string (CW-URI) defining usage rule information for the control word (CW), and a second message in which the message authentication code is attached to the bit string (AD) indicating the application data. Alternatively, the secure version of the provisioning data may include a first message in which the signature using the signature key (SSK) associated with the sender is attached to the bit string (CW-URI) defining usage rule information for the control word (CW) and a second message in which the signature using the signature key (SSK) associated with the sender is attached to the bit string (AD) indicating the application data.

In some embodiments, the method may further include receiving multiple signature verification keys from the processor, and providing a signature verification key used to verify authenticity of the secure version of the link key (LK), among the received signature verification keys, as an input of the cryptographic function (h). Each of the signature verification keys is associated with a conditional access/digital rights management system corresponding thereto.

The method may be implemented as computer-readable code stored in a computer-readable storage medium.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
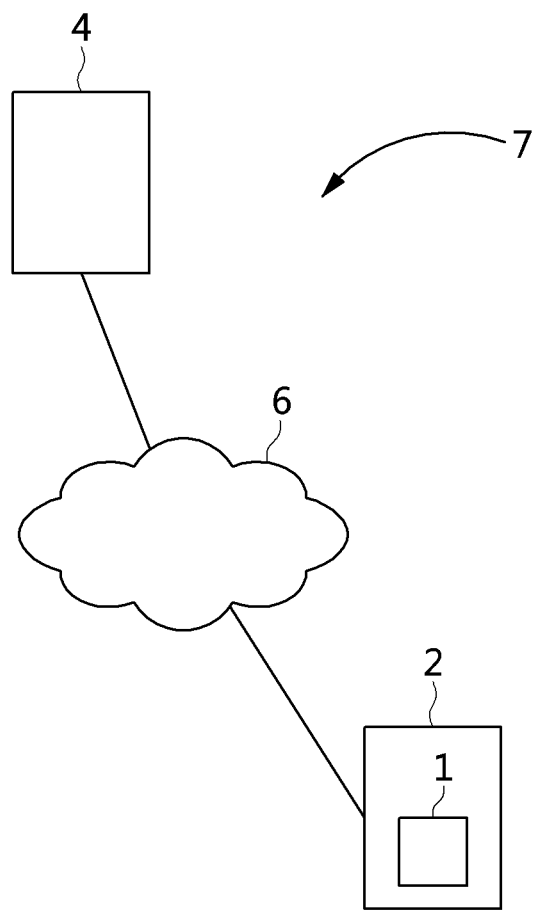
FIG. 1 is a diagram schematically illustrating an exemplary system according to an embodiment of the present invention.

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Further, terms such as "first", "second", "A", "B", "(a)", and "(b)" may be used to describe the components of the present invention. These terms are merely used to distinguish relevant components from other components, and the substance, sequence or order of the relevant components is not limited by the terms. In the present specification, it should be understood that the terms such as "include" or "have" are merely intended to indicate that components are present and are not intended to exclude a possibility that one or more other components will be present or added unless a description to the contrary is specifically pointed out in context. The term "unit" or "module" described in the present specification denotes a unit by which at least one function or operation is processed, which may be implemented using hardware or software, or a combination of hardware and software.

FIG. 1 is a diagram schematically illustrating an exemplary system according to an embodiment of the present invention. A system 7 includes a headend system 4 arranged to communicate with one or more content receivers 2 over a distributed network 6.

A content provider uses the headend system 4 to encrypt digital content thereof and protect the content from unauthorized access. The headend system 4 transmits a content stream (i.e. $\{content\}_{CW}$), scrambled using one or more control words CW, to the content receivers 2 over the distributed network 6. The headend system 4 transmits and manages encrypted control words and keys required for decryption of the control words (hereinafter referred to as "descrambling information") over the distributed network 6. The distributed network 6 may be an arbitrary network for delivering or broadcasting the descrambling information and a scrambled content stream to the content receivers 2. For example, the distributed network 6 may include a cable network, a satellite communication network, a terrestrial broadcasting network, the Internet, etc.

The scrambled content stream may include any type of data such as video data, audio data, image data, text data, application/software data, and program guide data.

Each of the content receivers 2 may be an arbitrary client device for receiving the descrambling information and the scrambled content stream. For example, the content receiver 2 may be a set-top box, a receiver integrated into a content output device (e.g. a TV or radio), a mobile terminal that supports a broadcasting service, or a personal computer. The content receiver 2 may include a device (e.g. a screen, a speaker, etc.) for outputting or playing descrambled and decoded content to the user, or may be connected to the device via communication.

The content receiver 2 includes a chipset 1 in which one or more content decryption operations are implemented. A cryptographic key establishment protocol is used to securely transmit content decryption keys from the headend system 4 to the chipset 1 included in the content receiver 2. The content receiver 2 uses the method that is described below with reference to FIGS. 2 and 3.

Figure 2:
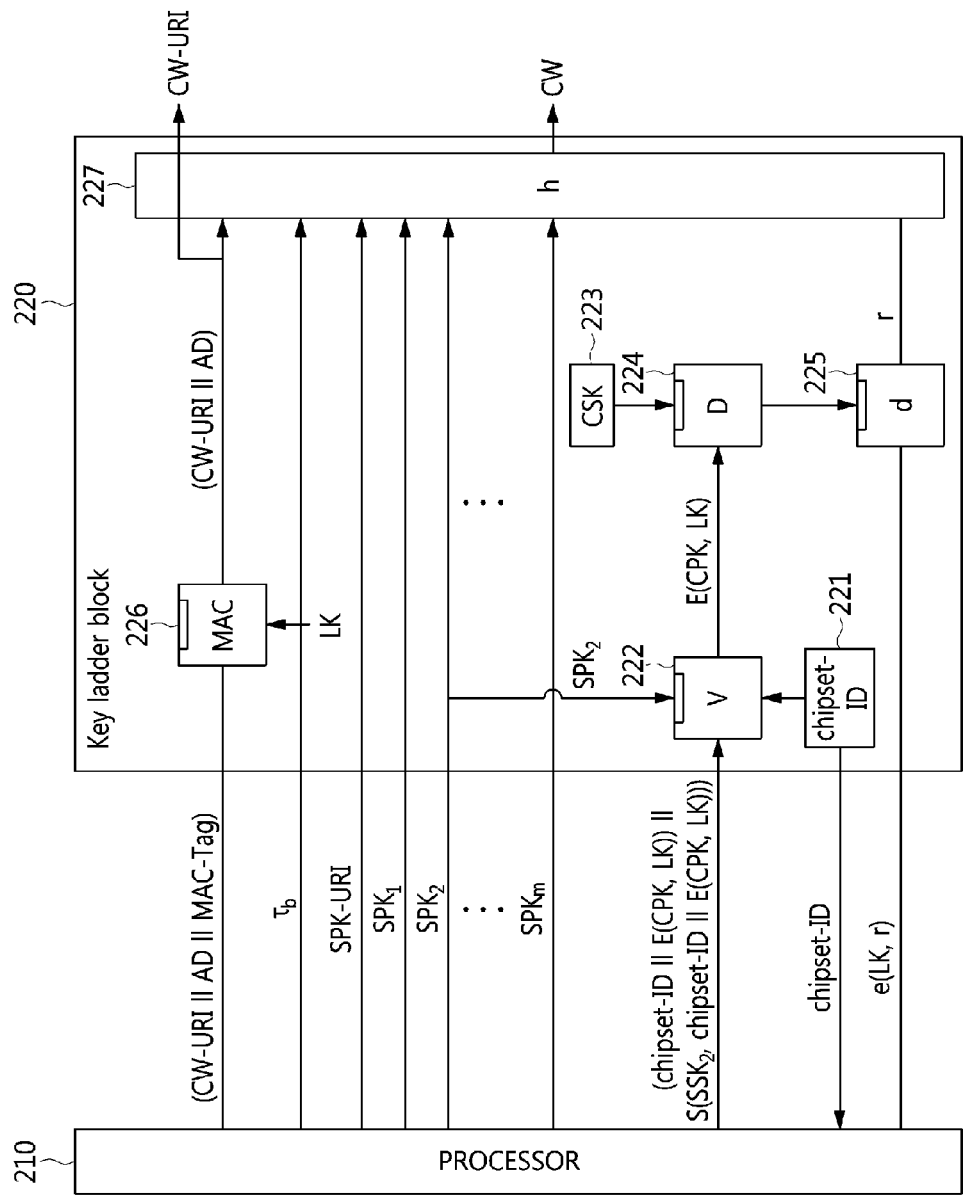
FIG. 2 is a diagram schematically illustrating a decryption key establishment method performed in the chipset of a content receiver according to an embodiment of the present invention.

FIG. 2 is a diagram schematically illustrating a decryption key establishment method performed in the chipset of the content receiver according to an embodiment of the present invention. The method shown in FIG. 2 indicates some steps of a cryptographic key establishment protocol implemented in the chipset of the content receiver and is typically referred to as a "key ladder".

A block for implementing the key ladder in the chipset is called a "key ladder block" 220. The chipset is personalized by a unique chipset-ID 221 and a chipset secret/private key (CSK) 223. The chipset-ID and CSK may be stored in a memory device in the chipset.

One of the outputs of the key ladder block 220 is a control word, indicated by "CW". The control word is used for one of content decryption and content encryption. The second output of the key ladder block 220 is a bit string indicated by "CW-URI". The CW-URI defines Usage Rule Information (URI) for the CW. The CW and the CW-URI are input to a content descrambler (not shown). The CW-URI has a predefined length (e.g. 64 bits), and numbers (ranging from 0 to 63) are assigned to respective bits from left to right. The value of the CW-URI defines permitted usage for the CW. When the value of a bit is 1, the defined usage is permitted, whereas when the value of the bit is 0, the defined usage is not permitted. The content descrambler is implemented to use the CW depending on the usage defined by the received CW-URI.

The key ladder block 220 interfaces with the processor 210 of the content receiver. For example, the processor 210 may be a secure processor or the Central Processing Unit (CPU) or the content receiver. As shown in FIG. 2, the processor 210 has read access to the chipset-ID 221. This chipset-ID 221 allows a content provider to identify the corresponding chipset and acquire a public key certificate including a Chipset Public Key (CPK) from an authentication institution. As will be described later, notification of the value of the CPK must be provided to the key ladder so as to calculate one of input messages.

A key pair (CSK, CPK) is related to a public key encryption scheme. Corresponding encryption and decryption operations are respectively indicated by E and D 224. Each of E and D has two inputs, that is, a key input and a message input. In the present specification, a first input for these operations is assumed to be a key. For example, encryption of a message M using the Chipset Public Key (CPK) is indicated by "E(CPK, M)".

The key ladder also uses a digital signature scheme. S and V 222 indicate a signature creation operation and a signature verification operation, respectively. A key pair in the digital signature scheme is associated with a sender, and is composed of a Sender Secret/private Key (SSK) and a Sender Public Key (SPK). In the present specification, the sender is assumed to be a content protection system. As shown in FIG. 2, multiple different SPKs, indicated by $SPK_1$, $SPK_2$, ..., $SPK_m$ ($m \geq 1$), are input to the key ladder block 220. Each key pair ($SSK_i$, $SPK_i$) is typically associated with a single content protection system, but a single key pair may be shared between multiple systems.

SPK-URI is associated with $SPK_1$, $SPK_2$, ..., $SPK_m$. The SPK-URI input to the key ladder block 220 defines usage rule information (URI) for $SPK_1$, $SPK_2$, ..., $SPK_m$. As shown in FIG. 2, one of SPKs and a verification operation V are used to verify the signature of an input message (chipset-ID∥E(CPK, LK)∥S($SSK_i$, chipset-ID∥E(CPK, LK))). In FIG. 2, it is assumed that i=2 and the use of $SPK_2$ for the verification of a signature is permitted by SPK-URI and usage rules.

The key ladder also implements a symmetric encryption scheme. In this scheme, encryption and decryption operations are respectively indicated by e and d 225. The key ladder uses a link key LK as a key for this scheme, and uses a random number r as a message. The random number r is represented by a bit string, and has a predefined length (e.g. 128 bits). In the present invention, the random number r is referred to as a "virtual control word".

The key ladder implements a Message Authentication Code (MAC) algorithm. The key ladder uses, as a key for this scheme, the link key LK or a key derived from the link key, and uses CW-URI and application data (AD) as an input message. The output of the MAC algorithm is a tag T having a preset length. The key ladder guarantees the integrity and authenticity of some CW-URI and AD of the inputs of the key ladder block using the MAC algorithm. In FIG. 2, a MAC operation indicated by "MAC" 226 is used to verify the tag T of a message (CW-URI∥AD∥T) that is input to the key ladder block. A detailed description of the MAC operation 226 implemented in the key ladder block will be made later with reference to FIG. 3. In the present specification, some (CW-URI and AD) of the inputs of the key ladder block will be referred to as "provisioning data".

The length of the application data AD is predefined (e.g. 256 bits). Since a detailed specification of AD does not fall within the scope of the present specification, it is assumed that, in the present specification, the key ladder block does not process the AD, except that the key ladder block provides AD as the input of a function h. The key ladder block may deliver all or part of AD, together with CW-URI and CW, to the content descrambler.

The length of another input $\tau_b$ of the key ladder block is predefined (e.g. 8 bits). The value of the bit string $\tau_b$ indicates the presence or absence of associated data. The sender may selectively send associated data, together with $e(LK_t, r)$, to the key ladder. When $\tau$, which is an integer expression of $\tau_b$, is 0, associated data is not present.

Finally, the key ladder block implements a function h 227. This function is based on a cryptographic hash function. In the key ladder, the inputs of the function h 227 are CW-URI, $\tau_b$, AD, SPK-URI, $SPK_1$, $SPK_2$, ..., $SPK_m$, and r. If the above inputs are not received by the key ladder block 220, or if the lengths of the inputs are not identical to predefined lengths, the key ladder block 220 stops the operations. Otherwise, the function h 227 applies an Integer-to-Bit String Conversion (I2BSP) data conversion primitive to each of SPK inputs. Here, the I2BSP data conversion primitive is a primitive for converting an integer into a bit string. For example, a function I2BSP(x) receives x, which is a 2048-bit integer, and outputs a bit string having a length of 2048 bits. Next, the function h concatenates bit strings indicating the corresponding inputs with each other so as to obtain message M, as given in the following equation:

$$M = r \| CW\text{-}URI \| \tau_b \| AD \| SPK\text{-}URI \| I2BSP(SPK_1) \| I2BSP(SPK_2) \| \ldots \| I2BSP(SPK_m)$$

The length of each of the inputs is predefined. The function h 227 performs a predefined hash operation (e.g. SHA-256(M)), and delivers a truncated message digest (e.g. 256 bits) to the content descrambler. If the length of the CW is N bits, the content descrambler truncates the output of the function h 227 to N bits.

Figure 3:
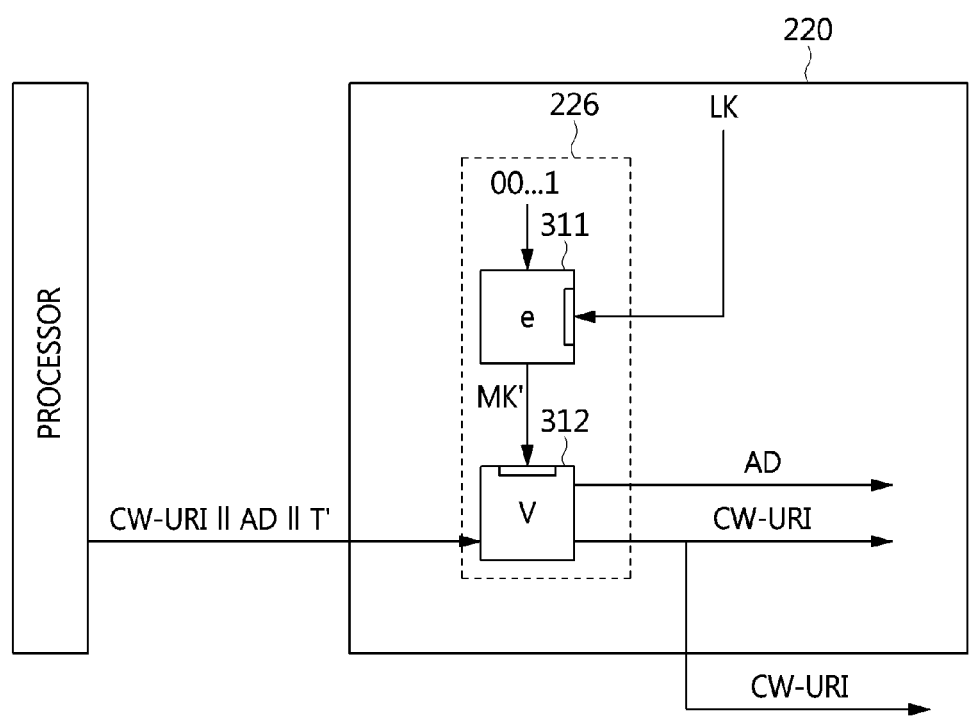
FIG. 3 is a diagram schematically illustrating a Message Authentication Code (MAC) algorithm implemented in a key ladder block according to an embodiment of the present invention.

FIG. 3 is a diagram schematically illustrating a MAC algorithm implemented in the key ladder block according to an embodiment of the present invention.

A block 266 for implementing the MAC algorithm receives a link key LK and a message (CW-URI∥AD∥T'), and outputs CW-URI and AD. A MAC key MK' is generated by encrypting a bit string having a length of 128 bits using the link key LK. This encryption operation is indicated by e 311 in FIG. 3. The bit string of 128 bits illustrated in FIG. 3 is composed of 127 '0' bits and one '1' bit (the rightmost bit). A MAC operation indicated by v 312 in FIG. 3 uses a key MK' derived from the link key as a MAC key, and uses CW-URI∥AD∥T' as an input message. If the verification of the tag T' succeeds, the MAC operation v 312 outputs CW-URI and AD. A detailed description of the MAC algorithm is disclosed in, for example, ISO/IEC 9797-1: 2011: "Information technology—Security techniques—Message Authentication Codes (MACs)—Part 1: Mechanisms using a block cipher".

Below, key ladder operations will be described.

A sender associated with any key pair may generate a signed first input message, that is, (chipset-ID∥E(CPK, LK)∥S(SSK$_i$, chipset-ID∥E(CPK, LK))), using the following steps:

Calculation on Sender Side
1. Generate a link key LK.
2. Calculate cryptogram E(CPK, LK).
3. Concatenate a chipset-ID with E(CPK, LK): A concatenated bit string is indicated by (chipset-ID∥E (CPK, LK)).
4. Make a signature on the bit string (chipset-ID∥E(CPK, LK)) using SSK$_i$. The signature is indicated by S(SSK$_i$, chipset-ID∥E(CPK, LK)).
5. Attach the signature to the bit string (chipset-ID∥E (CPK, LK)).

After the signed first input message and the sender's public key SPK$_i$ have been received, the key ladder block performs the following procedure in order to generate the link key LK. The calculated link key LK may be stored in the memory device in the chipset.

Calculation on Key Ladder Block Side
1. Verify whether the received chipset-ID is identical to a stored chipset-ID. When these two values are not identical to each other, the key ladder block stops the operation.
2. Check whether SPK-URI and usage rules permit the verification operation V to use SPK$_i$ so as to verify the signature. When the use of SPK$_i$ is not permitted, the key ladder block stops the operation.
3. To verify the signature, use the received 'signed first input message' and SPK$_i$. If the signature is not valid, the key ladder block stops the operation.
4. Calculate LK=D(CSK, E (CPK, LK)).

Next, the key ladder block uses the link key LK to process an input message e(LK, r). The sender generates the message e(LK, r), using the following steps:

Calculation on Sender Side
1. Generate a random number bit string r.
2. Calculate e(LK, r).

After e(LK, r) has been received and LK has been calculated, the key ladder block calculates r, using the following steps:

Calculation on Key Ladder Block Side
1. Calculate a random number bit string r=D(LK, e(LK, r))

Next, the key ladder block uses the link key LK or a key derived from the link key LK as a MAC key MK' in order to verify the integrity of provisioning data concatenated with a MAC-tag T'. It is assumed that the following exemplified operation uses the key derived from the link key LK. The sender generates the input message concatenated with the tag T', that is, CW-URI∥AD∥T', using the following steps:

Calculation on Sender Side
1. Calculate MK'=e(LK, 0000 . . . 1).
2. Calculate T'=mac(MK', CW-URI∥AD)
3. Concatenate the calculated tag T' with the bit string CW-URI∥AD.

After the message CW-URI∥AD∥T' has been received, the key ladder block verifies the authenticity of the bit string CW-URI∥AD, using the following steps:

Calculation on Key Ladder Block Side
1. Calculate MK'=e(LK, 0000 . . . 1).
2. Calculate T'=mac(MK', CW-URI∥AD).
3. Verify whether the received T' is identical to the calculated T'. If the two values are not identical to each other, the key ladder block stops the calculation.
4. When the verification succeeds, CW-URI and AD are searched for in the received message, and are then delivered to the function h.

Next, the key ladder block uses the function h to calculate the control word CW. As shown in FIG. 2, the inputs of the function h include CW-URI, $\tau_b$, AD, SPK-URI, SPK$_1$, SPK$_2$, . . . , SPK$_m$, and r. The implementation of the key ladder must guarantee that the public key used to verify the authenticity of the signed input message is provided, as one of the SPKs, to the function h when CW is derived from the random number r.

Next, the key ladder block delivers the CW-URI and the CW to the content descrambler.

As described above, the key ladder block has various types of inputs, such as CW-URI, AD, $\tau_b$, SPK-URL, SPKs, LK, and chipset-ID. Here, some inputs, such as LK and chipset-ID, are transferred from the sender to the key ladder block, with a cryptographic scheme and a digital signature scheme being applied to the inputs. Further, some other inputs of the key ladder block, such as CW-URI and AD, are transferred from the sender to the key ladder block, with a MAC tag being attached to the inputs. On the other hand, SPKs and SPK-URL may be transferred from the sender to the key ladder block without any cryptographic schemes being used, in consideration of the essential features of the SPKs and the SPK-URL. When tampering occurs in unprotected SPKs or SPK-URL, a control word CW is not generated, and thus it should be noted that the ultimate purpose of the content protection system that intends to protect content from unauthorized viewing may be achieved merely by utilizing the SPKs and SPK-URL. Similarly, since $\tau_b$ can be verified using a verification routine for associated data, any authentication scheme may not be applied to $\tau_b$.

FIGS. 4A to 4D are diagrams schematically illustrating other embodiments of a decryption key establishment method performed in the chipset of the content receiver according to the present invention.

In the key ladder described with reference to FIG. 2, a description has been made on the assumption that provisioning data includes CW-URI and AD. Unlike this, at least one of CW-URI and AD may be selectively included in the provisioning data in the present embodiments. Further, in the embodiment of FIG. 2, the authenticity of CW-URI and AD has been guaranteed by an MAC tag. Unlike this, the authenticity of CW-URI and AD may be protected in a manner similar to that of a link key LK (i.e. digital signature using SSK) in the present embodiments. These modifications will be described in detail with reference to FIGS. 4A to 4D.

Figure 4A:
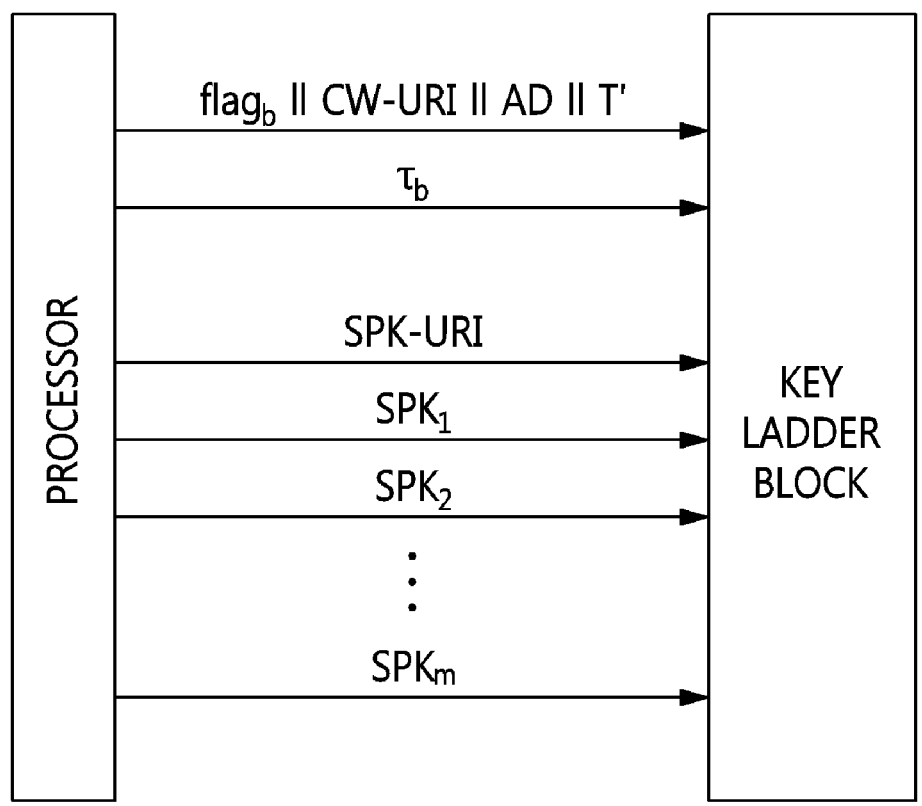
FIGS. 4A and 4D are diagrams illustrating other embodiments of a decryption key establishment method performed in the chipset of a content receiver according to the present invention.

Referring to FIG. 4A, in some exemplary embodiments, the provisioning data selectively includes two factors CW-URI and AD, and further includes a flag $flag_b$ indicating whether these factors are included in the provisioning data. In this case, a MAC operation indicated by "MAC" 226 in FIG. 2 is used to verify a tag T' contained in a message having the form of [$flag_b$||CW-URI (selective)||AD (selective)||T']. $Flag_b$ is a bit string having a predefined length (e.g. 8 bits). For example, $flag_b$ may be designated such that the values of two rightmost bits in the $flag_b$ mean the presence or absence of CW-URI and AD, respectively. When the value of $flag_b$ is "0000 011", the provisioning data may be implemented as a bit string in which $flag_b$, CW-URI, and AD are concatenated with each other (e.g. "$flag_b$||CW-URI||AD"). When the value of $flag_b$ is '0000 010', the provisioning data is implemented as a bit string in which $flag_b$ and CW-URI are concatenated with each other (e.g. "$flag_b$||CW-URI").

Figure 4B:
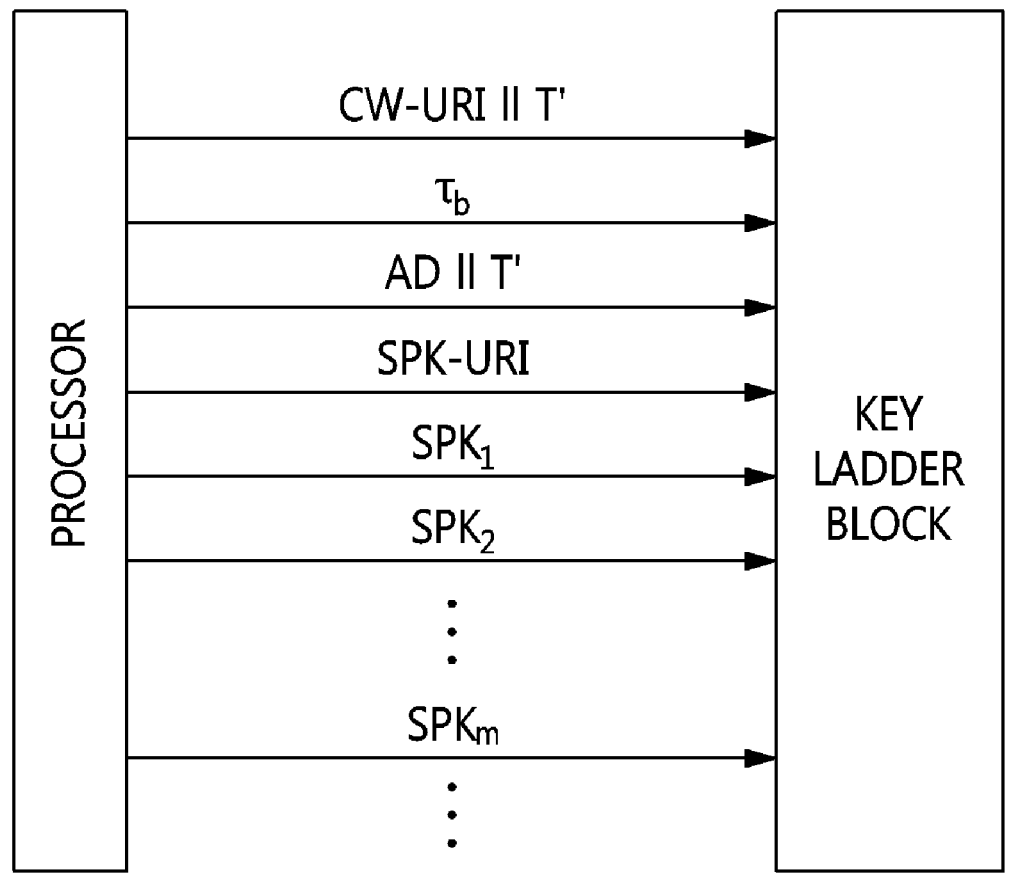

In another embodiment, CW-URI and AD may be delivered as separate secure messages. Referring to FIG. 4B, a secure version of CW-URI and a secure version of AD are input to the key ladder block. The secure version of the CW-URI has a form in which a MAC tag T' having a preset length is attached to the bit string CW-URI. The secure version of AD has a form in which a MAC tag T' having a preset length is attached to the bit string AD. The tags T' of the secure version of CW-URI and the secure version of AD are verified by the MAC operation illustrated in FIG. 3.

Figure 4C:
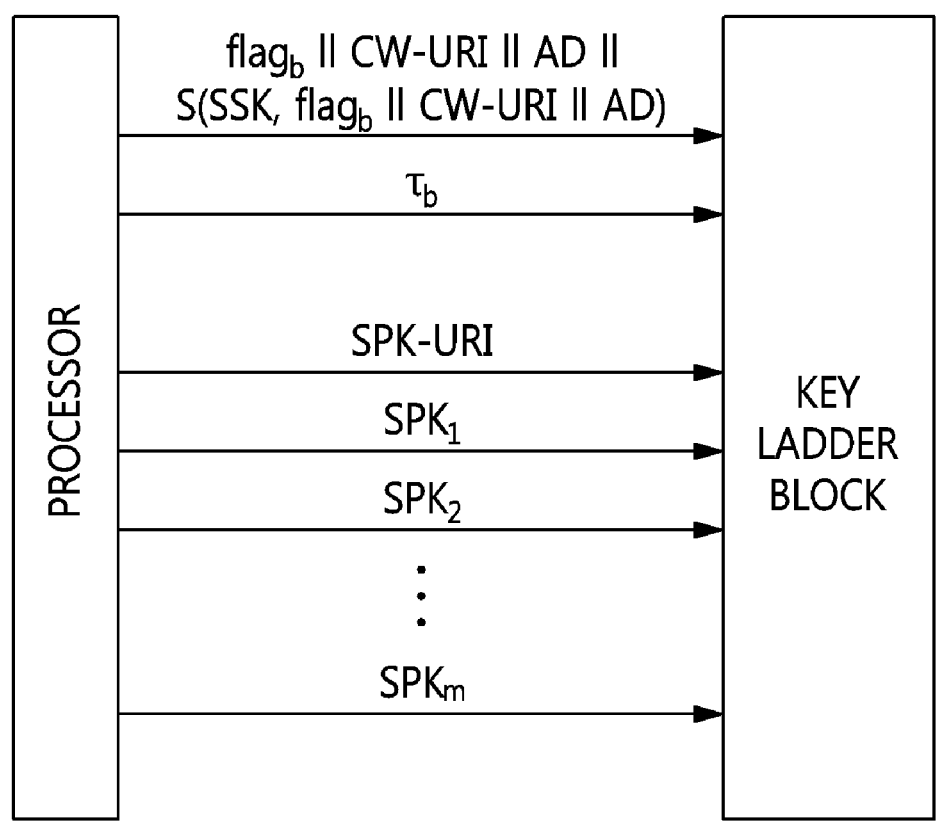

In a further embodiment, provisioning data is transferred from the sender to the key ladder block, with a signature using $SSK_i$ being attached to the provisioning data. Referring to FIG. 4C, the provisioning data is implemented in the form of [$flag_b$||CW-URI(selective)||AD(selective)] (this is identical to that of FIG. 4A). Such provisioning data is transferred from the sender to the key ladder block, with a signature using $SSK_i$, that is, S($SSK_i$, $flag_b$||CW-URI||AD) being attached to the provisioning data. In the key ladder block 220, the signature of the input message ($flag_b$||CW-URI||AD||S($SSK_i$, $flag_b$||CW-URI||AD)) is verified using one of SPKs and a verification operation V.

Figure 4D:
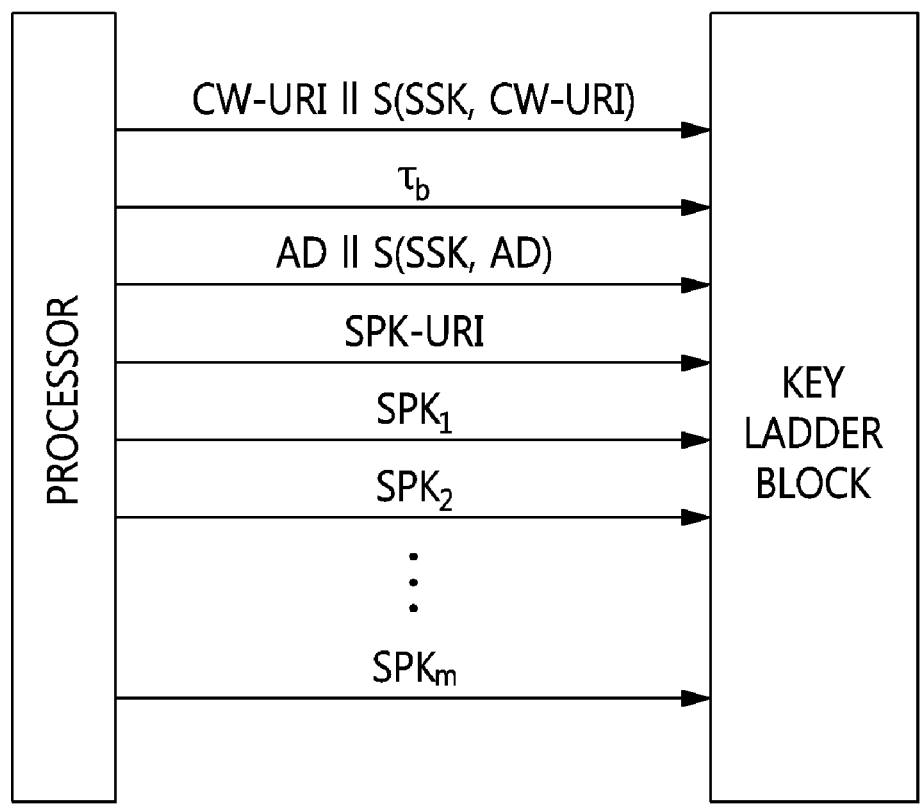

In yet another embodiment, CW-URI and AD may be delivered as separate secure messages. Referring to FIG. 4D, a secure version of CW-URI and a secure version of AD are input to the key ladder block. The secure version of CW-URI has a form in which a signature using $SSK_i$ is attached to the bit string CW-URI. The secure version of AD also has a form in which a signature using $SSK_i$ is attached to the bit string AD. The key ladder block 220 verifies signatures contained in these secure versions using one of SPKs and the verification operation V. When verification succeeds, CW-URI and AD may be input to the function h in order to calculate the control word CW.

Figure 5:
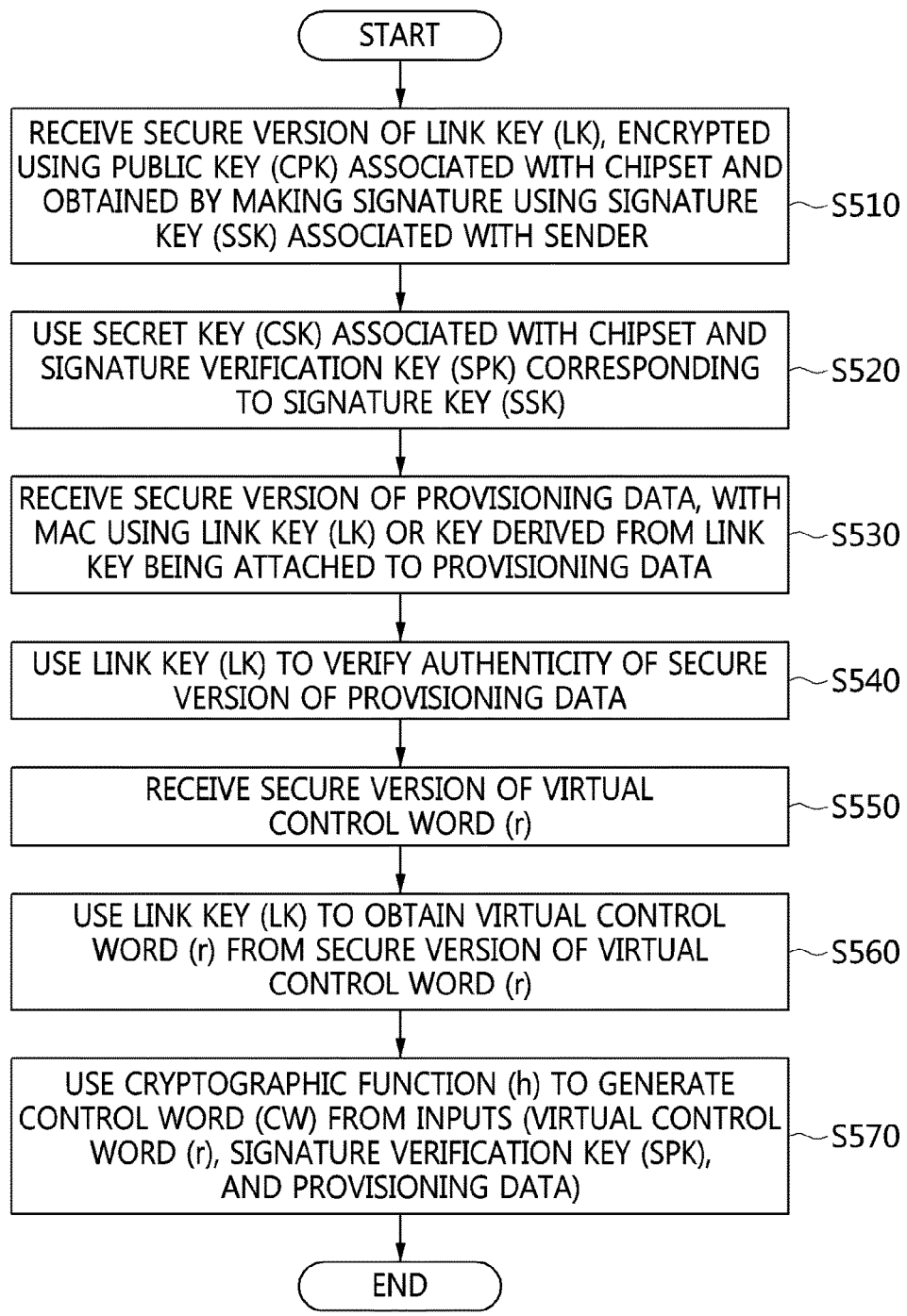
FIG. 5 is a flowchart illustrating a decryption key establishment method performed in the chipset of the content receiver according to an embodiment of the present invention.

FIG. 5 is a flowchart illustrating a decryption key establishment method performed in the chipset of the content receiver according to an embodiment of the present invention.

The chipset of the content receiver receives a secure version of a link key LK from the processor 210 of the content receiver communicably connected to the chipset at step S510. The secure version of the link key is encrypted using a public key CPK associated with the chipset so that the confidentiality of the link key is protected, and is obtained by making a signature using a signature key associated with the sender so that the authenticity of the link key is protected. In order to obtain the link key LK from the secure version of the link key, a stored chipset ID (chipset-ID), a signature verification key SPK corresponding to a signature key SSK, and a secret key CSK associated with the chipset are used at step S520. When the verification of the signature fails, the process is stopped.

The chipset receives a secure version of provisioning data from the processor 210 at step S530. The provisioning data includes a bit string CW-URI defining usage rule information (URI) for the control word CW. The provisioning data may further (selectively) include a bit string AD indicating application data. The secure version of the provisioning data may be obtained by attaching a message authentication code (MAC) that uses the link key LK itself or a key derived from the link key LK so that the authenticity of the provisioning data is protected. The chipset uses the link key LK obtained in the procedure at step S520 in order to verify the authenticity of the secure version of the provisioning data at step S540. When the verification fails, the process is stopped.

The chipset receives a secure version of a virtual control word r from the processor at step S550, and uses the link key LK obtained in the procedure at step S520 in order to obtain the virtual control word r from the secure version of the virtual control word r at step S560. The secure version of the virtual control word r is obtained by encrypting the virtual control word r using the link key LK.

The chipset uses a cryptographic function h to generate the control word CW from inputs at step S570. Here, the inputs include the virtual control word r, the signature verification key SPK, and the provisioning data. The inputs may further include both a bit string $\tau_b$ indicating the presence or absence of associated data and a bit string AD indicating application data. If the above inputs are not received by the key ladder block or if the length of each input is not identical to a predefined length, the key ladder block stops the operation.

Although the procedures ranging from step S510 to step S570 are described as being sequentially performed in FIG. 5, those skilled in the art to which the embodiments of the present invention pertain will appreciate that the present invention may be changed or modified in various forms in such a way as to perform the method while changing the sequence described in FIG. 5 or in such a way as to perform one or more of the procedures at steps S510 to S570 in parallel, without departing from the essential features of the present invention. Therefore, the method of FIG. 5 is not limited to a specific time-series sequence.

Meanwhile, the procedures shown in FIG. 5 may be implemented as computer-readable code in a computer-readable storage medium. The computer-readable storage medium includes all types of storage devices in which data readable by a computer system is stored. That is, examples of the computer-readable storage medium include a magnetic storage medium (e.g. Read-Only Memory (ROM), a floppy disk, a hard disk, etc.), an optical medium (e.g. Compact Disc (CD)-ROM, Digital Versatile Disk (DVD), etc.), and carrier waves (e.g. transmission over the Internet).

As described above, in accordance with the present embodiments, the chipset of a receiver in a conditional access system may securely receive control words from a headend system in a content delivery network.

The above description has been made only to exemplarily describe the technical spirit of the present embodiments, and those skilled in the art will appreciate that various changes and modifications are possible without departing from the essential features of the present embodiments. Therefore, the present embodiments are merely intended to describe the technical spirit of the present embodiment without restricting the technical spirit of the embodiments, and the scope of the technical spirit of the present invention is not limited by those embodiments. Therefore, the technical protection scope of the present invention should be defined by the accompanying claims, and all technical spirit of the claims and equivalents thereof should be construed as being included in the scope of the present embodiments.

What is claimed is:

1. A method for securely obtaining a control word (CW), the method comprising:
    receiving a secure version of a link key (LK) from a processor of a receiver;
    using a signature verification key (SPK) corresponding to a signature key (SSK) and a secret key (CSK) to obtain the link key (LK) from the secure version of the link key;
    receiving a secure version of provisioning data from the processor;
    using the obtained link key (LK) or the signature verification key (SPK) corresponding to the signature key (SSK) to verify authenticity of the secure version of the provisioning data;
    receiving a secure version of a virtual control word (r) from the processor;
    using the obtained link key (LK) to obtain the virtual control word (r) from the secure version of the virtual control word (r); and
    using a cryptographic function (h) to generate the control word (CW) from inputs, wherein the inputs include the virtual control word (r), the signature verification key (SPK), and the provisioning data.

2. The method of claim 1, wherein:
    the secure version of the link key (LK) is encrypted using a public key (CPK) so that confidentiality of the link key is protected, and is obtained by making a signature using the signature key (SSK) associated with a sender so that the authenticity of the link key is protected, and
    the secure version of the link key (LK) includes:
    i) a unique chipset ID (chipset-ID) associated with a chipset of the receiver, ii) a link key (LK) encrypted using the public key (CPK) associated with the chipset, and iii) a signature generated from the chipset ID and the encrypted link key (LK) using the signature key associated with the sender, and
    wherein using a signature verification key (SPK) comprises:
    i) verifying the signature using the signature verification key (SPK) corresponding to the signature key (SSK), and
    ii) decrypting the encrypted link key (LK) using the secret key (CSK) associated with the chipset.

3. The method of claim 2, further comprising:
    receiving multiple signature verification keys from the processor, wherein each of the signature verification keys is associated with a conditional access/digital rights management system corresponding thereto; and
    verifying the signature included in the secure version of the link key (LK) using one of the received signature verification keys.

4. The method of claim 2, further comprising storing, by the chipset, the link key (LK) obtained from the encrypted link key (LK) in order to use the link key (LK) for decrypting the secure version of the virtual control word (r), received by the chipset, and to verify authenticity of the secure version of the provisioning data.

5. The method of claim 3, further comprising determining, using the stored link key (LK), whether a message authentication code is identical to a message authentication code attached to the secure version of the provisioning data,
    wherein if it is determined using the stored link key (LK) that the message authentication code is not identical to the message authentication code attached to the secure version of the provisioning data, the link key (LK) is not used to obtain the virtual control word (r) from the secure version of the virtual control word (r).

6. The method of claim 1, further comprising:
    receiving multiple signature verification keys from the processor, wherein each of the signature verification keys is associated with a conditional access/digital rights management system corresponding thereto; and
    providing a signature verification key used to verify authenticity of the secure version of the link key (LK), among the received signature verification keys, as an input of the cryptographic function (h).

7. The method of claim 1, the secure version of the provisioning data is obtained by attaching a message authentication code (MAC) using the link key (LK) or a key derived from the link key to the provisioning data, or by making a signature using the signature key (SSK) associated with the sender so that authenticity of the provisioning data is protected.

8. The method of claim 7, wherein the secure version of the provisioning data includes a first message in which the message authentication code is attached to a bit string (CW-URI) defining usage rule information for the control word (CW), and a second message in which the message authentication code is attached to the bit string (AD) indicating the application data.

9. The method of claim 7, wherein the secure version of the provisioning data includes a first message in which the signature using the signature key (SSK) associated with the sender is attached to the bit string (CW-URI) defining usage rule information for the control word (CW) and a second message in which the signature using the signature key (SSK) associated with the sender is attached to the bit string (AD) indicating the application data.

10. The method of claim 1, wherein:
    the provisioning data is configured to selectively include at least one of i) a bit string (CW-URI) defining the usage rule information for the control word (CW), and ii) the bit string (AD) indicating the application data, and
    the provisioning data further includes a bit string ($flag_b$) defining whether each of the bit strings is included in the provisioning data.

* * * * *